Nov. 28, 1967  M. A. HALL  3,354,998

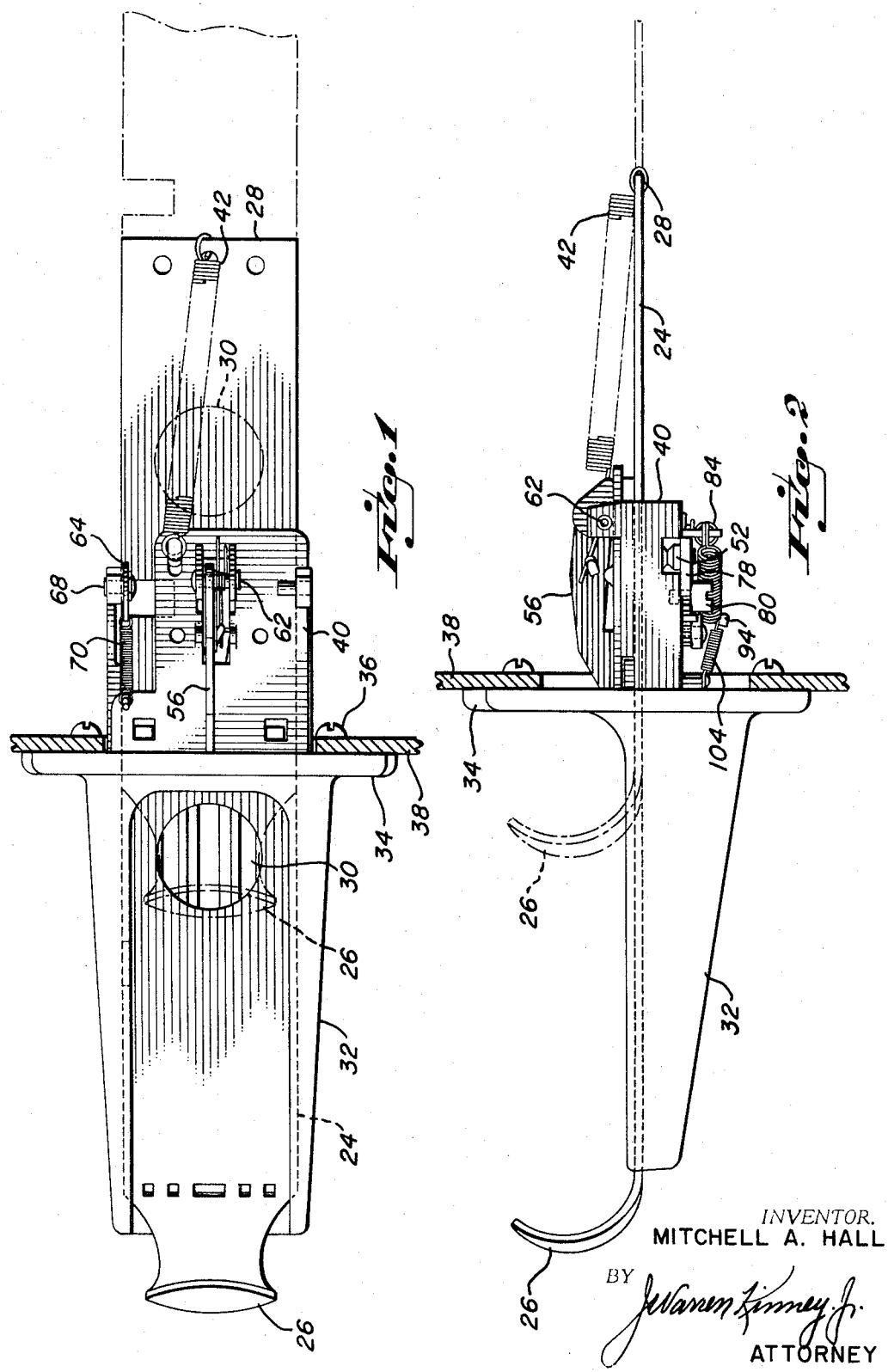

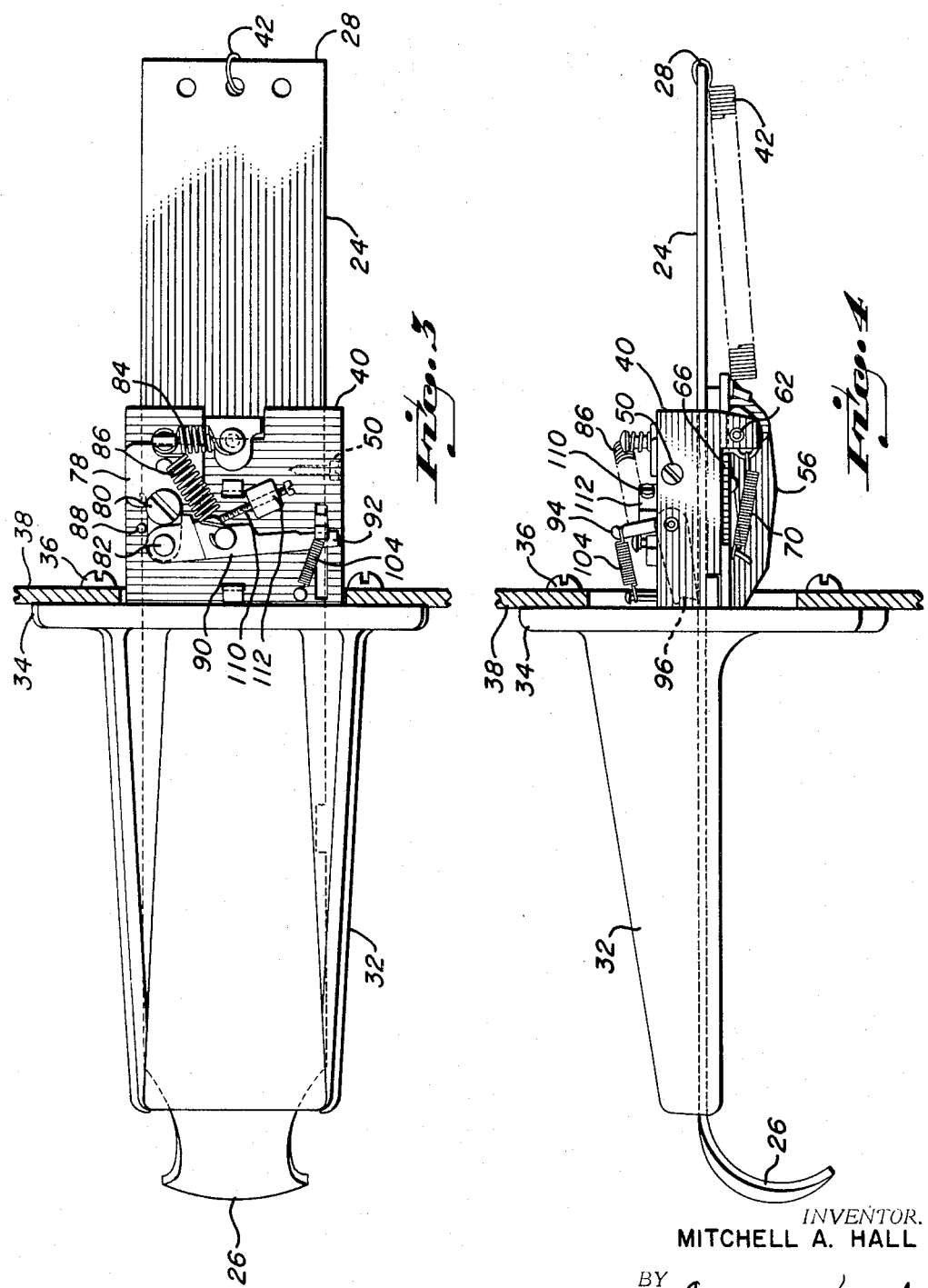

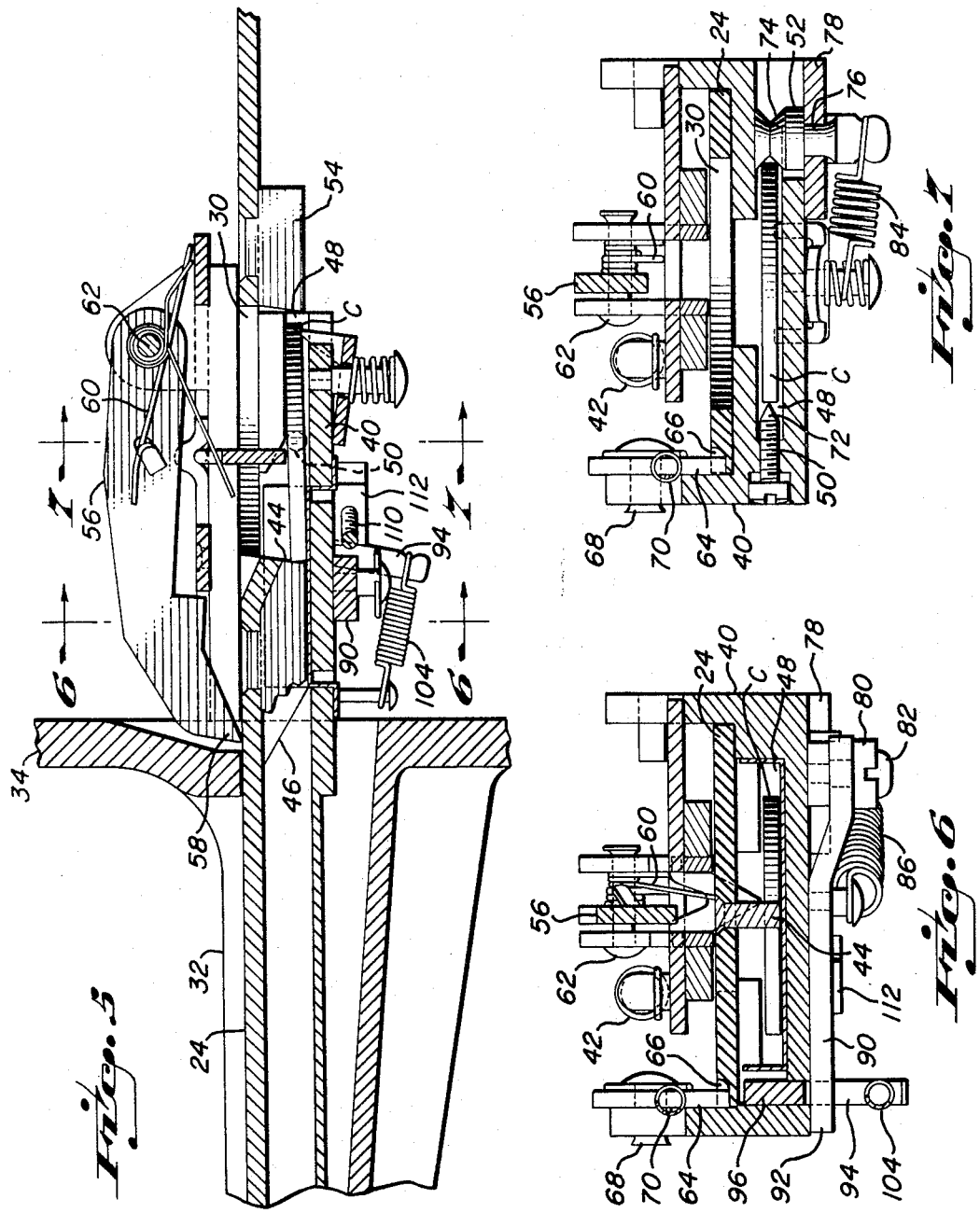

COIN CHUTE CONSTRUCTION

Filed Jan. 7, 1966  8 Sheets-Sheet 4

INVENTOR.
MITCHELL A. HALL
BY *Warren Kinney Jr.*
ATTORNEY

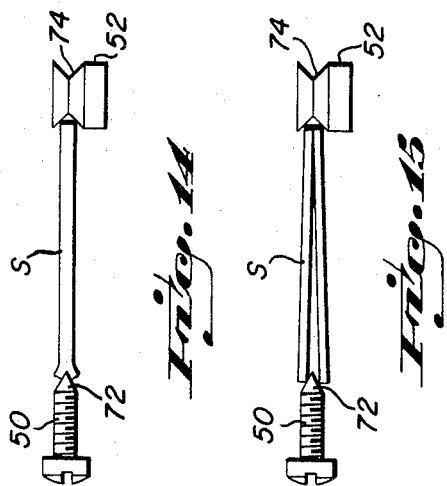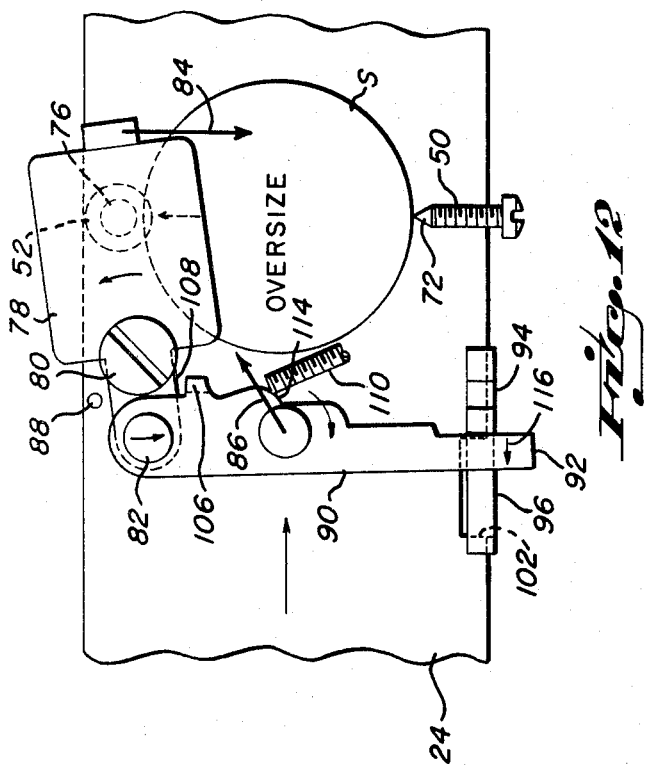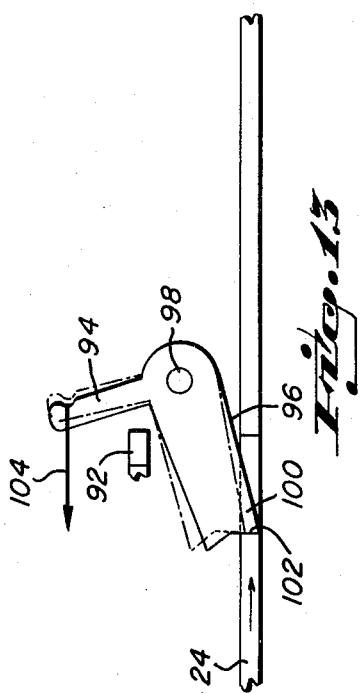

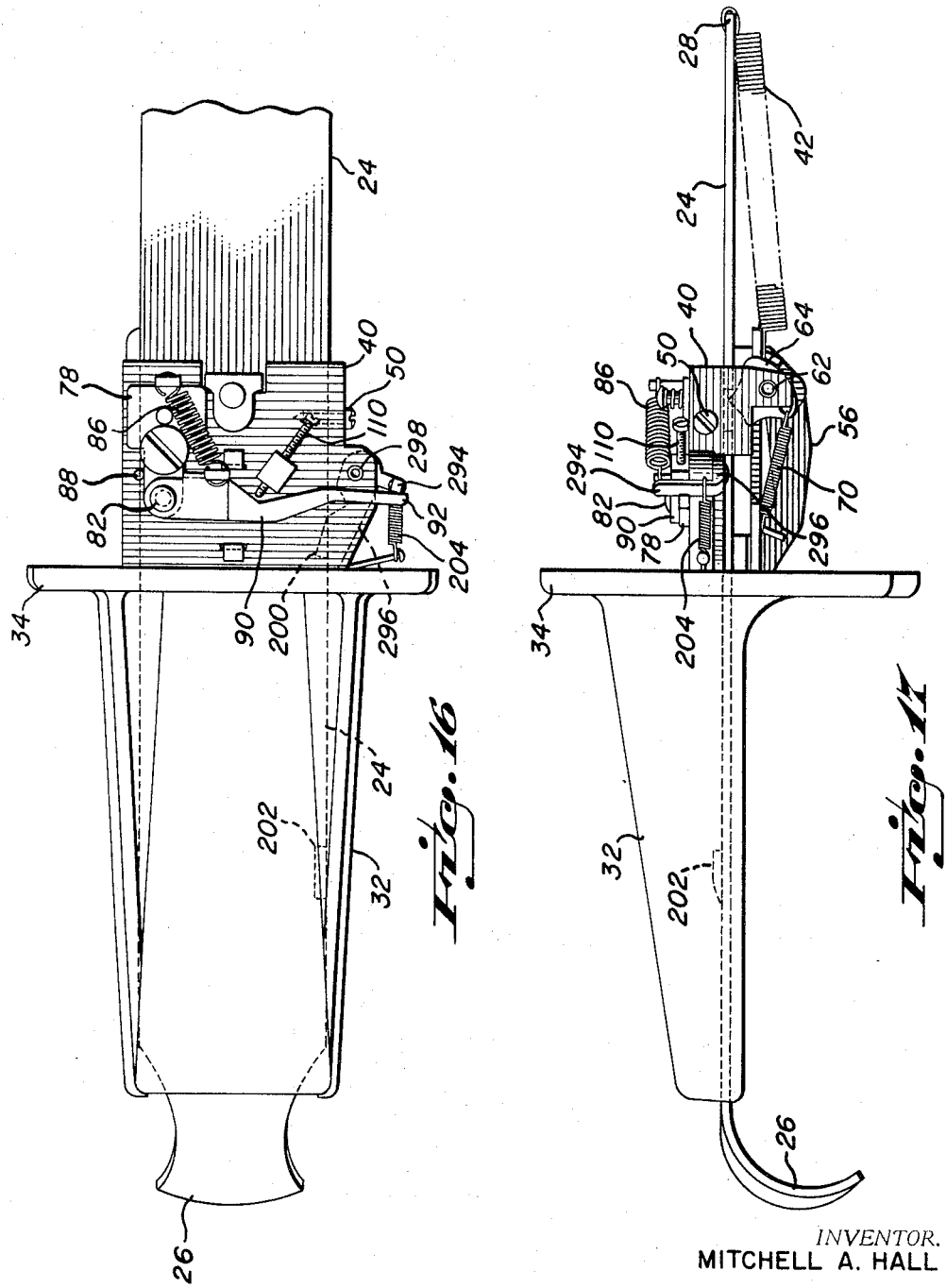

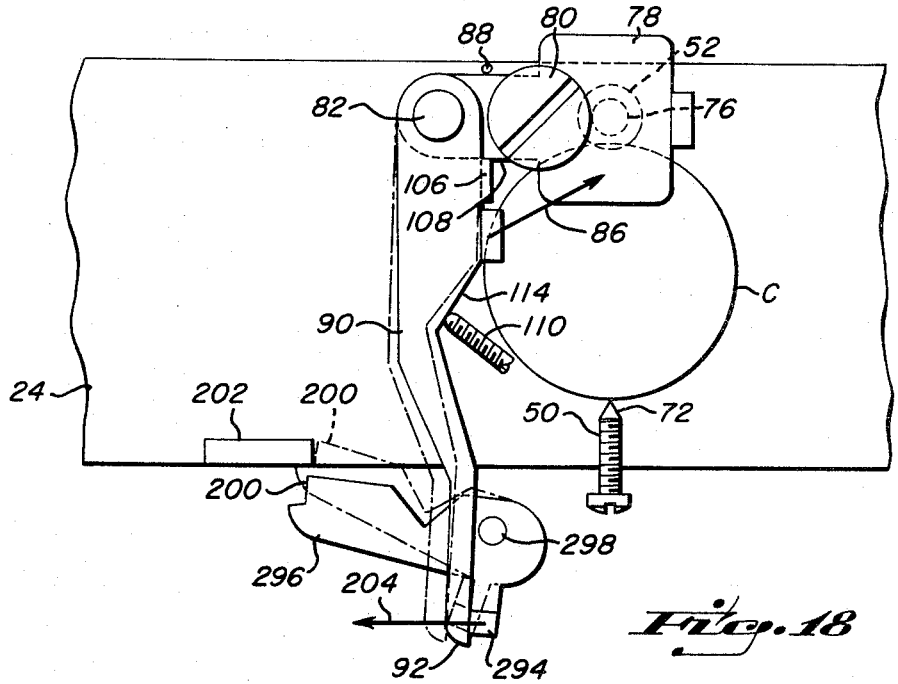
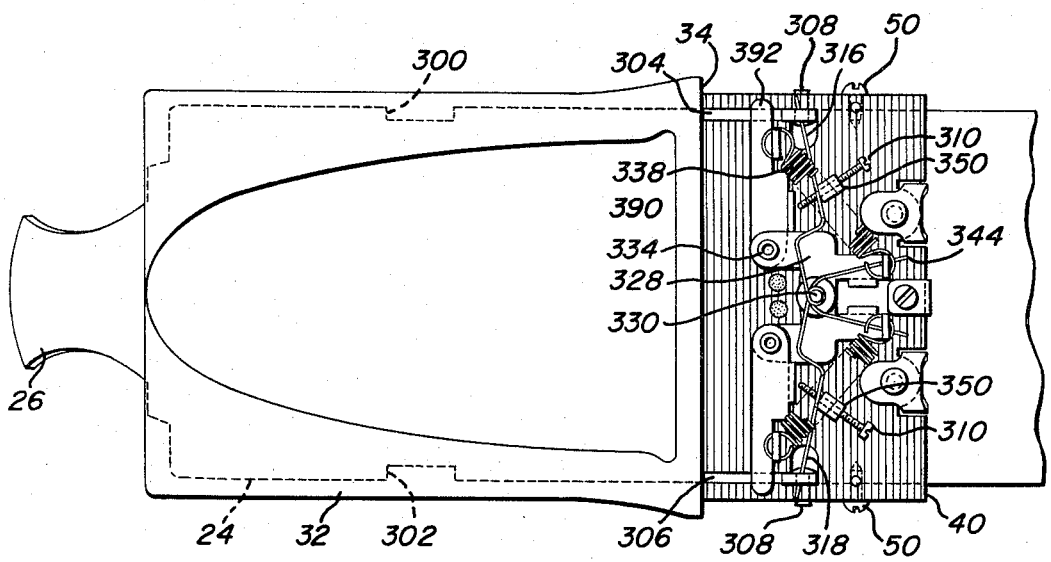

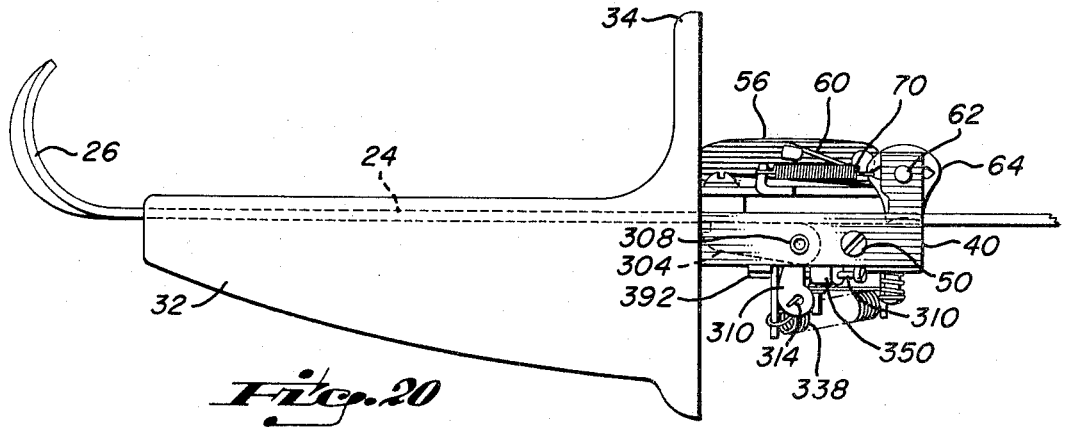
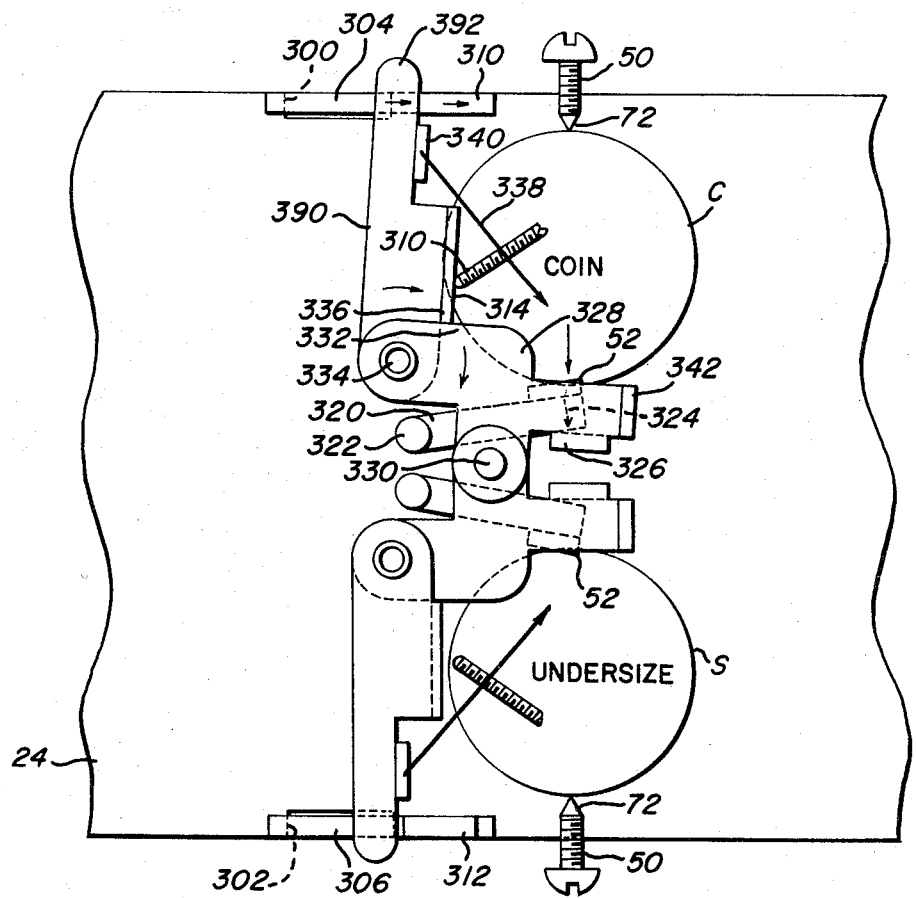

United States Patent Office 3,354,998
Patented Nov. 28, 1967

3,354,998
COIN CHUTE CONSTRUCTION
Mitchell A. Hall, 445 Rossford Ave.,
Fort Thomas, Ky. 41075
Filed Jan. 7, 1966, Ser. No. 519,234
20 Claims. (Cl. 194—57)

ABSTRACT OF THE DISCLOSURE

The coin chute construction includes a latch actuator pivoted upon a carrier, rather than upon the coin chute housing, which carrier is rockably mounted upon the housing for movement by coins to be calipered. The latch actuator is spring-biased in one direction only, for rotation relative to the carrier to a limit of rotation imposed by a stop lug, so that movement of the carrier may at times enforce corresponding movement of the latch actuator. At other times, as when rocking movement of the carrier is excessive due to presentation of an oversize coin or slug for calipering, a camming device acts upon the latch actuator to enforce counter-rotation thereof, in opposition to the force of the spring biasing the latch actuator, for release of a coin slide latch to engaging position with a keeper on the coin slide.

---

This invention relates to a coin chute construction.

An object of the invention is to improve the effectiveness with which a coin chute tests and rejects spurious coins or slugs.

Another object of the invention is to provide in a coin chute, improved coin testing means so arranged as to reduce the overall size of the structure, and thereby conserve space within the cabinet of a dispensing machine or the like controlled by the coin chute.

Another object is to reduce the weight and size of a coin chute, with resultant savings in manufacturing cost, shipping and handling expense, and servicing costs.

A further object of the invention is to provide in connection with a coin chute, means for testing and rejecting spurious coins or slugs which may deviate from genuine coins in many respects, including hardness characteristics, thickness, over or under size in diametral dimensions, and laminated materials constructions sometimes resorted to in the production of illicit slugs.

Another object is to improve the dependability and sensitivity of coin chute operation, and to defeat attempted manipulation in the effort to obtain illicit dispensation of goods or services from machines controlled by the coin chute.

The foregoing and other objects are attained by the means described herein and illustrated upon the accompanying drawings, in which:

FIG. 1 is a top plan view of the improved coin chute, showing the slide thereof in normal retracted and advanced positions.

FIG. 2 is a side elevational view of the same.

FIG. 3 is a bottom plan view of the same.

FIG. 4 is a side elevational view of FIG. 3.

FIG. 5 is an enlarged fragmental cross-section taken on the major axis of the FIG. 1 illustration.

FIG. 6 is a cross-section taken on line 6—6 of FIG. 5.

FIG. 7 is a cross-section taken on line 7—7 of FIG. 5.

FIG. 12 is a plan view similar to FIGS. 8 and 10, showing the effect of calipering an oversize coin or slug, and resulting in latching the slide against full advancement.

FIG. 13 is a view similar to FIGS. 9 and 11, showing the slide-latching effect of conditions characterizing FIG. 12.

FIG. 14 illustrates the calipering elements of the device testing and rejecting a soft slug.

FIG. 15 illustrates the calipering elements of the device testing and rejecting a laminated slug.

FIG. 16 illustrates a modification of the coin chute structure of FIGS. 1 to 15, and is a bottom plan view.

FIG. 17 is a side elevation of the FIG. 16 structure.

FIG. 18 is an enlarged fragmental diagrammatic plan view illustrating the latching and calipering elements of FIG. 16 testing an acceptable coin.

FIG. 19 is a bottom plan view of a second modification, indicating embodiment of the present invention in a coin chute adapted for operation with two coins.

FIG. 20 is a side elevation of the device of FIG. 19.

FIG. 21 is an enlarged fragmental diagrammatic plan view of the slide-latching and coin-calipering elements of FIG. 19, calipering an acceptable coin and an undersize slug.

Figure 10:
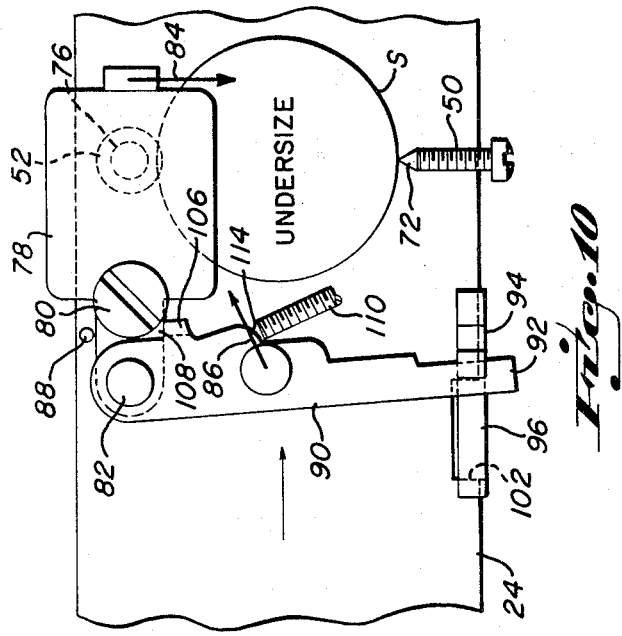
FIG. 10 is a plan view similar to FIG. 8, indicating the effects of calipering an undersize coin or slug, preventing advancement of the slide to fully extended position.

In all the drawing views, an acceptable coin or token is denoted C, whereas unacceptable coins or slugs are identified by the reference character S. As is usual, the device comprises a slide 24 having at its outer end an actuating handle 26, whereby the slide may be reciprocated between a normally retracted inoperative position, and an extended or fully advanced position. These positions are indicated upon FIGS. 1 and 2 by full lines and broken lines, respectively. Intermediate its ends 26 and 28, the slide is provided with a coin-receptive aperture 30, which normally is exposed to receive a coin therein. Upon full advancement of the slide, its inner end 28 may strike and move an actuating element (not shown), the purpose of which is to initiate dispensation of goods or services offered by a dispensing machine or the like.

In addition to slide 24, the coin chute comprises a forwordly extended bracket 32 having a transverse face plate 34 whereby the bracket is secured, as by means of screws 36, to an apertured wall 38 of a cabinet which houses a dispensing machine or the like, not shown. Upon the inner face to face plate 34 is fixedly mounted a rear housing 40, which carries the various coin-testing devices needed for determining acceptability of a coin or token deposited in slide aperture 30. Both the housing 40 and bracket 32 may carry guides or ways to support slide 24 for straight-line reciprocation. A spring 42 tends constantly to return the slide to retracted position.

The slide, as best shown in FIGS. 5 and 6, carries a fixed depending coin pusher 44, which normally advances a coin down an incline 46 to a lower chamber 48 within housing 40, in which chamber the coin is subjected to calipering by the calipering elements 50 and 52. A reverse pusher 54 fixed to the coin slide ahead of aperture 30, makes possible, under certain conditions well known in the art, the return of a coin to the depositor.

With reference to FIGS. 1 to 7, the reference numeral 56 denotes a rockable dip lever having a forward end 58 constantly yieldingly urged toward slide 24 by a spring 60, the lever being pivoted upon housing 40 at 62. The forward end 58 serves to stop advancement of the slide when the slide aperture carries no coin, or when the slide aperture carries a perforated slug. The provision of a dip lever as shown, is common practice in the art and should require no detailed treatment here.

The coin chute may be provided with the customary reversing pawl or ratchet 64 to normally override a line of teeth 66 formed in slide 24 as the slide advances. The pawl or ratchet functions to prevent retraction of the slide, or partial reciprocation thereof, once the slide has been cleared for full advancement by favorable action of all the coin-testing components. This prevents the attempt to initiate more than one actuation of the dispensing machine for a single proper coin deposited in the slide aperture. The pawl may be pivoted upon the rear housing at 68, and is usually biased by a spring 70, according to common practice.

The coin-calipering means, which includes the elements 50 and 52, operates to latch the coin slide at an intermediate position of advancement whenever the slide presents a spurious coin or slug having certain characteristics. The slide will be so latched upon presentation of coins or slugs which are oversize or undersize as to diameter or thickness, as well as those formed of soft materials such as lead, fiber, card-board or the like, and slugs of laminated materials as generally assembled.

As disclosed herein, the coin-calipering element 50 may be in the form of a threaded screw having a hardened sharply pointed end 72 which may sink into the edge of a soft slug (FIG. 14), or may part the laminations of a laminated slug (FIG. 15). The screw is threadedly mounted in a stationary part of rear housing 40, for adjustment of its pointed end toward and from calipering element 52. Elements 50 and 52 engage a coin for calipering while the coin is advanced through chamber 48 by pusher 44, FIGS. 6 and 7.

Calipering element 52 may be in the form of a wheel, button, or block, which has formed in its periphery a V-groove 74 receptive of the edge of a coin or slug. The distance which a coin or slug may enter the V-groove is dependent upon the thickness thereof.

Figure 8:
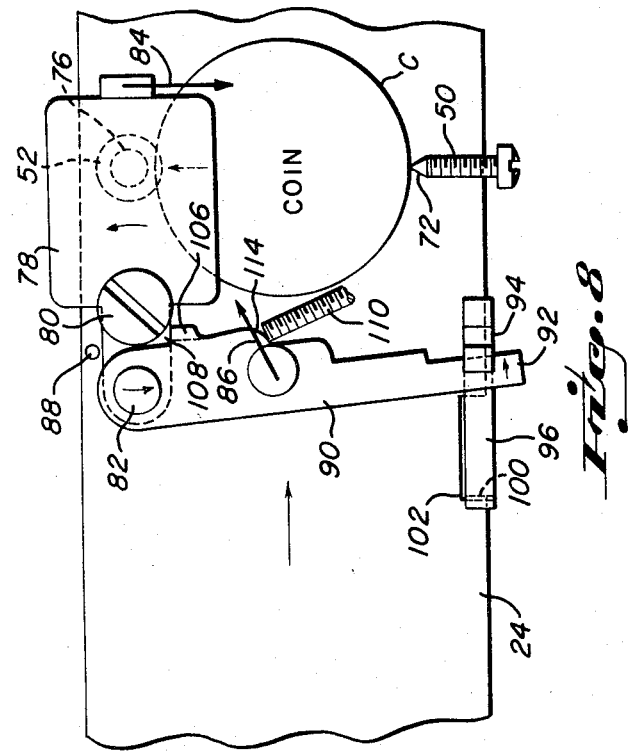
FIG. 8 is an enlarged diagrammatic plan view of the structure shown by FIG. 3, and indicating the effects of passing and calipering an acceptable coin or token.
Figure 9:
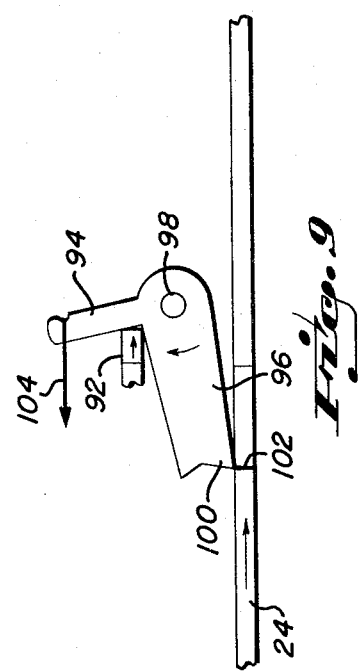
FIG. 9 is a side elevation showing the slide-latching elements of FIG. 8 in slide-releasing condition.

With reference to FIGS. 8 to 11, calipering element 52 is shown mounted upon a shaft 76 which is fixed near one end of a rockable carrier 78, the carrier being pivoted as by means of screw 80, upon rear housing 40, FIG. 3. The opposite end of carrier 78 carries a pivot 82, which is shifted transversely of slide 24 as carrier 78 is rocked about its pivot 80 incident to advancement of a coin or slug between the calipering elements 50 and 52. The heavy arrows on FIGS. 8 and 10 represent spring tensions imposed by the springs 84 and 86 of FIG. 3. Spring 84 tends to move the calipering element 52 toward element 50 and against an edge of coin C. A stop pin 88 fixed on housing 40 limits rotation of carrier 78 in clockwise direction.

A latch actuator in the form of a lever 90, has one end mounted upon carrier 78 at pivot 82. The latch actuator has a swingable free end or finger 92, which, as FIG. 11 indicates, may strike and move the arm 94 of a latch lever 96. Latch lever 96 may be pivoted at 98 upon the rear housing 40 of the coin chute, and its toothed end or nose 100 may engage or disengage a keeper or notch 102 formed in a side edge of slide 24 intermediate the ends thereof. Latch tooth 100 is normally biased by a spring 104 toward engagement with notch 102, but may be displaced to a disengaging position by actuator finger 92, FIG. 9.

It should be noted that latch actuator 90 carries a stop lug 106 turned at right angles to the plane of the actuator, said stop lug being held against an edge of carrier 78 at 108, by the action of spring 86. Thus, any rocking movements of carrier 78 about its pivot 80 may serve to correspondingly swing the latch actuator 90 and its free end 92, with one exception presently to be explained.

Note the adjustable screw 110 which has threaded engagement in a block 112 that is fixed upon housing 40. The free outer end of screw 110 is directed toward, but does not normally touch, an inclined cam edge 114 formed on latch actuator 90 intermediate its ends. When a proper coin is undergoing calipering, as in FIG. 8, the coin acts to rock the parts 78 and 90 as a unit, to lift the latch from engagement with slide notch 102, as in FIG. 9, thereby permitting movement of the slide to full advancement. Should the coin or slug be undersize, as in FIG. 10, the actuator end 92 will not be moved to the extent necessary for fully lifting the latch, and the situation of FIG. 11 will result, thereby to latch the slide against full advancement. Similarly, the latch will not be lifted to release the slide, under conditions exemplified by FIGS. 14 and 15.

Assuming now that a slug advanced to the calipering elements is oversize in diameter or in thickness, such slug will have the effect of augmenting the movements of parts 78 and 90. Accordingly, the tilting of carrier 78 about its pivot 80 will be extreme (FIG. 12), causing an extreme projection of latch actuator 90 which forces cam edge 114 to climb upon the free end of screw 110, thereby to displace actuator 90 away from screw 110 in the direction of arrow 116. The end 92 of the latch actuator accordingly will move away from latch arm 94 (FIG. 13), allowing spring 104 to move the latch into slide-engaging position so as to stop the slide advancement. In this way, an oversize slug is detected, and prevented from supporting movement of the slide to fully advanced position.

Figure 11:
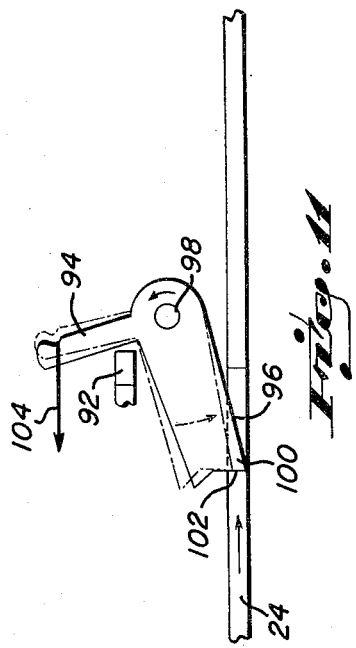
FIG. 11 is a side elevation similar to FIG. 9, and showing the slide intercepted by the latch against full advancement under the conditions exemplified by FIG. 10.

As is apparent from FIG. 12, the camming of actuator 90 by screw 110, causes lug 106 to disengage the edge 108 of rocker or carrier 78 until such time as slug S passes beyond the calipering elements 50 and 52. Such passage of the slug results in return of the parts 78, 90, 114, 92, and 96 to the relationship disclosed by FIGS. 10 and 11, which is the relationship assumed by the parts when no coin, or an undersized coin, is undergoing calipering. The relationship of the parts as disclosed by FIGS. 10 and 11, is the normal relationship occurring when the coin chute is not in use, and as is evident, latch 96 is poised to preclude full advancement of slide 24.

The screw 110 and the inclined cam 114 of latch actuator 90, may properly be referred to as a camming device to abnormally displace actuator finger 92 from proximity to latch arm 94, whenever an oversize slug enters the calipering zone. By preference, though not of necessity, the camming member or screw 110 is adjustable toward and from the cam edge 114. Part 110 might be a pin or a stud, either fixed or adjustable upon housing 40.

The modification, FIGS. 16, 17, 18, differs from the device heretofore described, in that the slide latch 296 is here pivoted for rocking movement in a plane parallel to the plane of the slide. The latch pivot 298 is supported upon housing 40 at one side thereof (FIG. 16), and the latch carries an integral arm 294 to which is attached a tension spring 204 serving to bias the latch nose 200 normally toward the slide axis. The nose of the latch, when projected by spring 204, overlaps a side margin of the slide and is in position to be struck by a keeper 202 carried by the slide upon partial advancement of the slide. The keeper 202 in this instance is in the form of a lug upstanding upon a face of the slide (FIG. 17), in position to strike and be stopped by the nose 200 of latch 296.

From the disclosure of FIGS. 16 and 18, it is evident that a partial rotation of latch 296 in counter-clockwise rotation about its pivot 298, removes the latch nose 200 from the path of advancement of keeper 202, thereby permitting full advancement of the slide. The broken line position of the latch in FIG. 18, stops the slide at an intermediate stage of advancement, due to latch nose 200 abutting the keeper 202.

In all respects other than as noted in the two preceding paragraphs, the operation of the coin chute of FIGS. 16, 17 and 18, is identical to the operation explained in detail with reference to FIGS. 1 to 15. Accordingly, the parts common to the two disclosed structures are herein identified by the same reference characters. In FIG. 18, the full lines show the relationship of elements.

occurring when a proper coin C is advanced between the calipering elements 50 and 52. An oversize slug, or an undersize slug, in passing the calipering elements, will result in latching the slide 24 against full advancement in precisely the manner disclosed in explaining the operation of FIGS. 1 to 15.

FIGS. 19, 20, and 21 disclose a second modification, in which two proper coins are required for properly operating the coin chute. The principal of operation here is the same as in the previously described structures, in that slugs which are oversize, or undersize, will fail to initiate release of the coin slide for full advancement.

Coin slide 24 in the case of FIGS. 19, 20, 21, is provided with two coin-receiving apertures and the usual pushers which advance the coins, or slugs, between two sets of calipering means 50–52 and 50–52 best illustrated by FIG. 21. Advancement of the slide is from left to right.

The slide at opposite side margins may be provided with keepers 300 and 302 (FIG. 21), here shown as notches formed in the edges of the slide. Latches to engage and disengage the keepers are denoted 304 and 306. One latch, 304, is shown in elevation upon FIG. 20, and is seen to be pivoted at 308 upon housing 40. Both latches 304 and 306 are so pivoted at opposite sides of the housing.

Each latch is provided with a nose to engage a keeper, in substantially the manner of FIG. 11, and each has an integral extending arm, these being indicated at 310 and 312. The arms may be perforated at 314 to accommodate resilient wire springs 316 and 318 which act constantly to urge the latch noses against one face of the coin slide, so that the latch noses may dip into the keeper notches 300 and 302 independently to stop the slide at an intermediate stage of advancement.

FIG. 21 shows slide 24 advancing a coin C and a slug S through separate calipering means 50–52, and 50–52, which calipering means are identical. It should suffice, therefore, to explain in detail one of the calipering means, such as the one measuring the acceptable coin C.

The stationary calipering element may be an adjustable pointed screw 50 like that of FIG. 8. The movable calipering element may be a V-grooved button as in FIG. 8, although as shown in FIG. 21, it is a V-grooved block 52 receptive of the coin edge to perform the same fuction as the V-grooved button or wheel of FIG. 8. According to FIG. 21, element 52 is fixed upon an arm 320 which is pivoted at 322 upon the coin chute housing. When a proper coin C engages the groove of calipering element 52, the coin moves element 52 in the direction of arrow 324.

Arm 320 abuts a lug 326 which is integral with carrier 328, so that movements of the arm in the direction of arrow 324 are translated, through lug 326, to carrier 328 which is pivoted at 330 upon the coin chute housing. Carrier 328 includes an arm 332 carrying at its free end a pivot 324, and upon this pivot is mounted the latch actuator 390. The latch actuator has a free end presenting a finger 392 to the arm 310 of latch 304, said finger being adapted to displace the latch from proximity with the slide, all as previously pointed out in the explanation of FIGS. 8 to 11.

Latch actuator 390 carries a stop lug 336 held in abutment against carrier arm 332 by means of a spring 338. The spring is tensioned between a lug 340 and a lug 342, these lugs being formed on actuator 390 and carrier 328, respectively. The composite structure consisting of actuator 390 and carrier 328, is urged in counter-clockwise direction about pivot pin 330 by means of wire spring 344 (FIG. 19), wrapped about the pivot pin. Thusly, calipering element 52 is constantly urged toward the stationary calipering element 50 to measure a coin C.

It should here be pointed out that calipering element 52 might be supported directly upon carrier 328, as in FIG. 8. Moreover, the calipering element 52 may take the form of the V-grooved wheel or button previously mentioned, applied directly upon the carrier at the approximate location of block 52, FIG. 21. In any event, a proper coin C passed between the calipering elements of FIG. 21, will effect clockwise rotation of parts 328 and 390 in unison, for moving finger 392 against latch arm 310, this resulting in displacing the latch 304 from the path if advancement of keeper 300. The latch therefore will not interfere with movement of slide 24 to the fully advanced position, for actuating a dispensing machine.

The proper coin C passing between calipering elements 50 and 52, as above related, will move latch actuator 390 toward adjustable screw 310 to the extent that the cam face 314 of stop lug 336 will only lightly touch screw 310, without altering the angularity of actuator 390 to arm 332. On the other hand, if coin C were oversize, either in diameter or in thickness, an augmentation of rotary movement of carrier 328 would result, causing cam face 314 to impinge upon screw 310, with the screw acting to swing actuator 390 about pivot 334 in counter-clockwise direction, thereby withdrawing finger 392 from latch arm 310 and permitting the latch to engage the keeper 300. Such latch engagement will of course stop the slide at an intermediate stage of advancement, as was explained previously in the treatment of FIG. 12.

Should the coin or slug S of FIG. 21 be undersize, movements of the carrier and its associated latch actuator would be diminished to the extent that the finger of the latch actuator would fail to sufficiently displace the latch for release of the slide, and accordingly, the slide would be precluded from full advancement. The action would be the same as was described in explaining FIGS. 10 and 11.

The adjustable screws 310 in FIG. 19, threadedly enter support blocks 350 fixed upon housing 40, in the manner indicated at 112 of FIG. 3. The coin chute structure of FIGS. 19, 20 and 21, may include the usual coin pusher and dip lever 56, and the ratchet mechanism 64, as well as any other slug detecting and rejecting expedients generally incorporated in coin chutes.

With further reference to FIG. 21, it should be noted that the calipering and latching mechanisms shown in connection with slug S, are identical to those shown and just described in connection with coin C in this drawing figure. Also, the sharply pointed calipering elements 50 of FIGS. 19, 20 and 21, perform to detect soft or laminated slugs as shown in FIGS. 14 and 15.

Further with reference to FIG. 21, it should be appreciated that the latch 306 responding to an unacceptable slug S, will preclude full advancement of slide 24 even though the other latch 304 may be favorably activated by the proper coin C. Accordingly, both coins must be proper and acceptable to the calipering mechanisms, in order to obtain a full advancement of the coin slide and resultant operation of a dispensing machine controlled thereby.

In the several modifications of the coin chute disclosed, the coin-calipering and slide-locating mechanisms function in the same manner to preclude illicit operation of a slide-controlled dispensing machine. By adjusting the stationary calipering element and the adjustable camming device of the latch actuator, the apparatus may be rendered highly sensitive for distinguishing proper coins or tokens from spurious pieces of many types.

It is to be understood that various modifications and changes may be made in the structural details of the device, within the scope of the appended claims, without departing from the spirit of the invention.

What is claimed is:

1. A coin chute comprising in combination: an elongate reciprocable coin slide apertured to receive and advance a coin or slug, said slide being movable between a normal position of retraction and a position of full advancement; guide means for the slide, including a rear housing having therein a chamber through which the slide may advance a coin or slug; a latch pivoted upon the housing, and a keeper on the slide, said latch being movable to engaging and disengaging positions with respect to the keeper; means yieldingly urging the latch constantly toward said keeper-engaging position; a calipering means including a carrier rockable relative to the housing, and a calipering element movable with the carrier, operative to caliper a coin or slug while advancing through the housing chamber; and means controlled by the movable calipering element, for disposing the latch to keeper-engaging position when a slug undergoing calipering is either oversize or undersize in comparison with an acceptable coin, the keeper being so located upon the slide as to engage with the latch prior to full advancement of the coin slide.

2. The coin chute as specified by claim 1, wherein the aforesaid means controlled by the movable calipering element, comprises a latch actuator having two movements, the first of which disengages the latch from the keeper, and the second of which releases the latch for keeper engagement, upon unidirectional movement of the movable calipering element initiated by an oversize slug.

3. The coin chute as specified by claim 2, wherein the second movement of the latch actuator is produced by a stationary camming member operative upon an inclined cam face on the movable latch actuator.

4. The coin chute as specified by claim 3, wherein the stationary camming member is adjustable in position toward and from the cam face of the movable latch actuator.

5. The coin chute as specified by claim 1, wherein the aforesaid means controlled by the movable calipering element, comprises a latch actuator including a finger to strike and move the latch to a position of slide disengagement; and means responsive to unidirectional movement of the movable calipering element produced by an advancing oversize slug, for first moving the finger to disengage the latch from the keeper and then immediately moving the finger to release the latch for re-engagement with the keeper.

6. The coin chute as specified by claim 5, wherein the second stated movement of the finger is produced by a camming member operative upon the movable latch actuator subsequently to the first latch-disengaging movement of the finger.

7. The coin chute as specified by claim 6, wherein the camming member imparts no movement to the latch actuator and the finger thereof, upon subjection of a proper coin or an undersize slug to the calipering elements.

8. The coin chute as specified by claim 1, wherein the calipering means includes a normally stationary calipering element cooperating with the movable calipering element, said normally stationary calipering element having a sharply pointed end to contact and indent the edge of a soft slug passed between the calipering elements.

9. A coin chute comprising in combination: an elongate reciprocable coin slide apertured to receive and advance a coin or slug, said slide being movable between a normal position of retraction and a position of full advancement; guide means for the slide, including a stationary rear housing having therein a chamber through which the slide may advance a coin or slug; a latch pivoted upon the housing, and a keeper on the slide, said latch being movable to engaging and disengaging positions with respect to the keeper; a calipering means including a normally stationary calipering element and a cooperative movable calipering element operative to caliper a coin or slug while advancing through the housing chamber; a rockable carrier having opposite end portions and an intermediate portion; means pivoting the intermediate portion of the carrier upon the stationary housing; means supporting the movable calipering element for movement with one end portion of the carrier in spaced opposition to the stationary calipering element; an elongate latch actuator having one end pivoted upon the remaining end portion of the carrier, and a second end developed as a finger to strike and move the latch to the position of keeper disengagement; spring means for yieldingly maintaining the finger normally out of contact with the latch, and for yieldingly maintaining a normal predisposition of the latch actuator angularly to the carrier, the latch actuator being movable in correspondency with the carrier as an acceptable coin or an undersize slug is advanced between the calipering elements, to advance the finger against the latch for displacing the latch from the keeper-engaging position; and means operative incident to calipering of an oversize slug, to increase the normal angularity between the latch actuator and the carrier, thereby to displace the actuator finger from contact with the latch as the carrier is moved by the oversize slug unidirectionally away from the stationary calipering element.

10. The device as specified by claim 9, wherein the means last mentioned comprises a cam face on the latch actuator, and a camming element normally in fixed position upon the housing, said camming element having an end to abut and slide along the cam face for rotating the latch actuator about its pivotal connection with the carrier, only upon a movement of the carrier exceeding the extent of movement initiated by a slug having a dimension larger than the corresponding dimension of an acceptable coin or token.

11. The device as specified by claim 10, wherein the aforesaid end of the camming element is selectively adjustable toward and from the cam face of the latch actuator.

12. The device as specified by claim 11, wherein the normally stationary calipering element is selectively adjustable toward and from the movable calipering element.

13. The device as specified by claim 9, wherein are duplicated at opposite sides of the central axis of the slide, the elements identified as the latch, the keeper, the calipering means, the latch actuator, the carrier, the spring means, and the means to increase the normal angularity between the latch actuator and the carrier.

14. The device as specified by claim 12, wherein are duplicated at opposite sides of the central axis of the slide, the elements identified as the latch, the keeper, the calipering elements, the latch actuator, the carrier, the spring means, and the means to increase the normal angularity between the latch actuator and the carrier.

15. The device as specified by claim 9, wherein the normally stationary calipering element is provided with a sharply pointed end to contact and indent the edge of a soft slug advanced between the calipering elements.

16. The device as specified by claim 9, wherein the slide latch and the pivoted end of the elongate latch actuator are disposed at opposite sides of the major axis of the slide, and the latch actuator extends transversely of the line of reciprocation of the slide.

17. The device as specified by claim 9, wherein the keeper is in the form of a notch formed in the slide, and the pivot for the latch supports the latch for movement in a plane which is normal to the plane of the slide.

18. The device as specified by claim 9, wherein the keeper is in the form of a lug extending from a face of the slide, and the pivot for the latch supports the latch for movement in a plane which is substantially parallel to the plane of the slide.

19. A coin chute comprising in combination: an elongate reciprocable coin slide apertured to receive and advance a coin or slug, said slide being movable between a normal position of retraction and a position of full advancement; guide means for the slide, including a rear housing having therein a chamber through which the slide may advance a coin or slug; a keeper on the slide; a latch on the housing movable to engaging and disengaging positions with respect to the keeper; means yieldingly urging the latch constantly toward said keeper-engaging position; a stationary calipering element; a movable calipering element disposed in spaced opposition to the stationary calipering element, for displacement away from said stationary calipering element to a first predetermined position by an acceptable coin advanced by the slide, and to a second position beyond said first predetermined position when subjected to displacement by an oversize coin or slug; means yieldingly urging the movable calipering element toward the stationary calipering element; a movable latch actuator connected to the movable calipering element; and having an end portion to strike and move the latch to keeper-disengaging position upon displacement of the movable calipering element to the first predetermined position aforesaid; means normally maintaining the latch actuator end portion out of contact with the latch; and means operative incident to a continuous advancement of an oversize coin or slug between the aforesaid first and second positions of the movable calipering element, for swinging the latch actuator in opposite directions, to effect a momentary disengagement followed by a successive re-engagement of the latch relative to the keeper.

20. The coin chute as specified by claim 19, wherein is included adjustable means for regulating the timing between the latch disengagement and re-engagement movements.

References Cited

UNITED STATES PATENTS

| | | | |
|---|---|---|---|
| 2,632,547 | 3/1953 | Steiner | 194—102 X |
| 3,064,788 | 3/1960 | Hall | 194—102 X |
| 3,137,378 | 6/1964 | Hall | 194—92 |
| 3,200,926 | 8/1965 | Hall | 194—92 |

WALTER SOBIN, *Primary Examiner.*